United States Patent [19]

Backes et al.

[11] Patent Number: 5,499,320
[45] Date of Patent: Mar. 12, 1996

[54] EXTENDED TASK SPACE CONTROL FOR ROBOTIC MANIPULATORS

[75] Inventors: Paul G. Backes, La Crescenta; Mark K. Long, Altadena, both of Calif.

[73] Assignee: The United States of America as represented by the Administrator of the National Aeronautics and Space Administration, Washington, D.C.

[21] Appl. No.: 34,607

[22] Filed: Mar. 24, 1993

[51] Int. Cl.$^6$ .................................................. G05B 19/00
[52] U.S. Cl. .......................................................... 395/95
[58] Field of Search .................................. 395/84, 86, 90, 395/93, 95, 98

[56] References Cited

U.S. PATENT DOCUMENTS

| | | | |
|---|---|---|---|
| 4,638,445 | 1/1987 | Mattaboni | 395/904 |
| 4,831,531 | 5/1989 | Adams et al. | 364/434 |
| 4,837,734 | 6/1989 | Ichikawa et al. | 395/84 |
| 4,956,790 | 9/1990 | Tsuchihashi et al. | 395/99 |
| 4,999,553 | 3/1991 | Seraji | 395/95 |
| 5,038,089 | 8/1991 | Szakaly | 318/568 |
| 5,046,022 | 9/1991 | Conway et al. | 395/85 |
| 5,047,700 | 9/1991 | Szakaly | 318/568 |
| 5,053,975 | 10/1991 | Tschihashi et al. | 395/99 |
| 5,072,361 | 12/1991 | Davis et al. | 395/83 |
| 5,086,400 | 2/1992 | Hayati et al. | 395/86 |
| 5,150,026 | 9/1992 | Seraji et al. | 395/90 |
| 5,231,693 | 7/1993 | Backes et al. | 395/84 |

OTHER PUBLICATIONS

Backes, "Multi-Sensor Based Impedance Control for Task Execution", Proc of 1992 IEEE Int'l Conf on Robotics & Automation, May 12–14, 1992, pp. 1245–1250.
Backes, "Generalized Compliant Motion with Sensor Fusion", 5th Int'l Conf on Advanced Robotics, Robots in Unstructured Environments, Jun. 1991, pp. 1281–1286.
Yamauchi et al, "A Behavior Based Architecture for Robots Using Real Time Vision", Proc IEEE Int'l Conf on Robotics & Automation, Apr. 1991, pp. 1822–1827.
Su et al, "Task Decomposition for a Multi–Limbed Robot to Work in Reachable but Unorientable Space", IEEE Transactions on Robotics & Automation, vol. 7 No. 6. Dec. 1991, pp. 759–770.
Connell, "A Behavior Based Arm Controller", IEEE Transactions on Robotics & Automation, vol. 5 No. 6, Dec. 1989, pp. 784–791.
T. Tsuchihashi, Y. Wakahara and K. Asano, A Computer Aided Manipulation System for Multijoint Inspection Robot; International Conference on Advanced Robotics; pp. 363–369; 1985.
M. Montemerlo and A. Deyoung, Man–Machine Redundancy in Remote Manipulator Systems; NATO Advanced Research Workshop; Jun. 27–Jul. 1, 1988.
Dale A. Lawrence and R. Michael Stoughton. Position–based impedance control, achieving stability in practice. In Proceedings AIAA Conference on Guidance, Navigation, and Control pp. 221–226, Monterey, CA., Aug. 1987.

(List continued on next page.)

Primary Examiner—Allen R. MacDonald
Assistant Examiner—Thomas J. Onka
Attorney, Agent, or Firm—John H. Kusmiss

[57] ABSTRACT

The invention is a method of operating a robot in successive sampling intervals to perform a task, the robot having joints and joint actuators with actuator control loops, by decomposing the task into behavior forces, accelerations, velocities and positions of plural behaviors to be exhibited by the robot simultaneously, computing actuator accelerations of the joint actuators for the current sampling interval from both behavior forces, accelerations velocities and positions of the current sampling interval and actuator velocities and positions of the previous sampling interval, computing actuator velocities and positions of the joint actuators for the current sampling interval from the actuator velocities and positions of the previous sampling interval, and, finally, controlling the actuators in accordance with the actuator accelerations, velocities and positions of the current sampling interval. The actuator accelerations, velocities and positions of the current sampling interval are stored for use during the next sampling interval.

31 Claims, 10 Drawing Sheets

OTHER PUBLICATIONS

H. Seraji, M. Long, and T. Lee. Configuration control of 7 dof arms. In Proceedings IEEE International Conference on Robotics and Automation, pp. 1195–1200, 1991.

Mark K. Long. Task directed inverse kinematics for Redundant manipulators. Journal of Intelligent and and Robotic Systems, 6:241–261, 1992.

O. Egeland, J. R. Sagli, and I. Spangelo. A damped least–squares solution to redundancy resolution. In Proceedings IEEE International Conference on Robotics and Automation, Sacramento, CA, Apr. 1991.

Wyatt S. Newman and Mark E. Dohring. Augmented impedance control: an approach to compliant control of kinematically redundant manipulators. In Proceedings IEEE International Conference on Robotics and Automation, 1991.

H. Seraji and R. Colbaugh. Improved configuration control for redundant robots. Journal of Robotic Systems, 7(6):897–928, 1990.

Paul G. Backes, John Beahan, and Bruce Bon. Interactive command building and sequencing for supervised autonomy. In Proceedings IEEE International Conference on Robotics and Automation, Atlanta, Georgia, May 1993.

Paul G. Backes, Mark K. Long and Robert D. Steele. The modular telerbot task execution system for space telerbotics. In Proceedings IEEE International Conference on Robotics and Automation, Atlanta, Georgia, May, 1993.

N. Hogan. Impedance control: an approach to manipulation: part i—theory. ASME Journal of Dynamic Systems, Measurement, and Control, 107: 1–7, Mar. 1985.

Y. Nakamura and H. Hanafusa. Inverse kinematic solutions with singularity robustness for robot manipulator control. ASME Journal of Dynamic Systems, Measurement, and Control, 108(3):163–171, 1986.

C. W. Wampler and L. J. Leifer. Applications of damped least squares methods to resolved rate and resolved acceleration control of manipulators. ASME Journal of Dynamic Systems, Measurement, and Control, 110(1):31–38, 1988.

EXTENDED TASK SPACE CONTROL FOR ROBOTIC MANIPULATORS

BACKGROUND OF THE INVENTION

1. Origin of the Invention

The invention described herein was made in the performance of work under a NASA contract, and is subject to the provisions of Public Law 96-517 (35 USC 202) in which the contractor has elected not to retain title.

2. Technical Field

The invention relates to a compliant motion control system for controlling a robot to perform specific tasks defined in terms of many simultaneous behaviors to be exhibited by the robot in different spaces in response to multiple inputs.

3. Background Art

The invention and its background will be described with reference to the following publications:

References

[1] N. Hogan. Impedance control: an approach to manipulation: part i—theory. *ASME Journal of Dynamic Systems, Measurement, and Control*, 107:1–7, March 1985.

[2] Dale A. Lawrence and R. Michael Stoughton. Position-based impedance control: achieving stability in practice. In *Proceedings AIAA Conference on Guidance, Navigation, and Control*, pages 221–226, Monterey, Calif. August 1987.

[3] Paul G. Backes. Generalized compliant motion with sensor fusion. In *Proceedings 1991 ICAR: Fifth International Conference on Advanced Robotics, Robots in Unstructured Environments*, pages 1281–1286, Pisa, Italy, Jun. 19–22 1991.

[4] R. Colbaugh. A unified approach to control manipulators with redundancy. In *Proceedings of IEEE International Conference on Robotics and Automation*, pages 1–18, 1990.

[5] H. Seraji, M. Long, and T. Lee. Configuration control of 7 dof arms. In *Proceedings IEEE International Conference on Robotics and Automation*, pages 1195–1200, 1991.

[6] Mark K. Long. Task directed inverse kinematics for redundant manipulators. *Journal of Intelligent and Robotic Systems*, 6:241–261, 1992.

[7] Richard A. Volpe. Task space velocity blending for real-time trajectory generation. In *Proceedings IEEE International Conference on Robotics and Automation*, Atlanta, Georgia, May 1993.

[8] Y. Nakamura and H. Hanafusa. Inverse kinematic solutions with singularity robustness for robot manipulator control. *ASME Journal of Dynamic Systems, Measurement, and Control*, 108(3):163–171, 1986.

[9] C. W. Wampler and L. J. Leifer. Applications of damped least squares methods to resolved rate and resolved acceleration control of manipulators. *ASME Journal of Dynamic Systems, Measurement, and Control*, 110(1):31–38, 1988.

[10] O. Egeland, J. R. Sagli, and I. Spangelo. A damped least-squares solution to redundancy resolution. In *Proceedings IEEE International Conference on Robotics and Automation*, Sacramento, Calif., April 1991.

[11] Wyatt S. Newman and Mark E. Dohring. Augmented impedance control: an approach to compliant control of kinematically redundant manipulators. In *Proceedings IEEE International Conference on Robotics and Automation*, 1991.

[12] H. Seraji and R. Colbaugh. Improved configuration control for redundant robots. *Journal of Robotic Systems*, 7(6):897–928, 1990.

[13] Paul G. Backes, John Beahan, and Bruce Bon. Interactive command building and sequencing for supervised autonomy. In *Proceedings IEEE International Conference on Robotics and Automation*, Atlanta, Ga., May 1993.

[14] Paul G. Backes, Mark K. Long, and Robert D. Steele. The modular telerobot task execution system for space telerobotics. In *Proceedings IEEE International Conference on Robotics and Automation*, Atlanta, Ga., May 1993.

Introduction

A large number of motion sources may be necessary in a robot control system which is expected to perform a wide variety of tasks. For example, a trajectory generator may be needed to provide position setpoints, force sensor inputs may be necessary for contact applications, hand controller inputs may be needed for operator control, gripper motion for grasps, and visual feedback for automatic alignment. Many tasks require a simultaneous combination of motion sources. A compliant grasp task requires simultaneous force control and gripper control. A shared control polishing task could use hand controller inputs to specify motion tangential to a surface while force control controls the force of contact with the surface and the manipulator reconfigures itself in real time to stay away from joint limits, singularities and collisions.

Previous work has described techniques for compliant motion control [1, 2], shared control [3], and redundancy resolution [4, 5, 6].

The necessary number of degrees of freedom (DOFs) of the mechanism can also vary depending on the task. A four DOF manipulator is sufficient for many pick and place operations. A six DOF manipulator is sufficient for placing objects in an arbitrary orientation. A seven DOF manipulator provides an ability to continuously change its internal link configuration for a constant tool position and orientation, and can extend the dextrous workspace. For the seven DOF manipulator, the possible dimension of the output motion (seven) is greater than the dimension of possible motion of the gripper (six). All of the mechanism DOFs should be available for task execution. The control scheme must therefore allow both a variable number of simultaneous input sources and a variable dimension task space.

There are different ways to implement a system to provide multiple input sources. One solution is to provide a flexible robot programming environment which provides a layered set of subroutines for robot applications programming. A custom program could then be developed to utilize the needed sensors for a specific task. A robot language could also be used to develop a program to merge control based upon multiple sensors. However, such an approach can be burdensome and cannot be used in space applications because the software must be fixed for flight qualification.

Accordingly, one object of the object of the invention is to provide a control architecture having a fixed software system with data driven execution.

A related object of the invention is to provide a control system which provides a large suite of capabilities based upon input data. This approach satisfies the requirements for space telerobotics where the flight component of the telerobotic system must be flight qualified as fixed flight software.

It is a further object of the invention to provide multiple control sources in which the behavior of control from each source is dependent on the parameterization data which can be sent from a distant ground station.

It is another related object of the invention for the actual task execution motion of the robot to be the resultant behavior of all the input sources.

SUMMARY OF THE DISCLOSURE

The invention is a compliant motion control system having a control architecture which allows execution of a task to be considered as the resultant behavior of execution of multiple concurrent behaviors. The dimensionality of the execution space of each behavior and the resultant behavior can be extended to the dimensionality of the controlled mechanism. Task description consists of decomposing the desired execution into the multiple simultaneous behaviors. Each behavior generates motion commands which are merged in a common motion space to compute a resultant command to the manipulator. The task space of each behavior can have the dimensionality of the mechanism being controlled. Control of a seven degree of freedom manipulator is described here so the available task space for each behavior has dimensionality seven.

While the invention is described below as applied to control of a seven DOF manipulator, it is also applicable to other redundant and non-redundant manipulators with various numbers of DOFs.

The invention controls the robot in successive sampling intervals to perform a task, the robot having joints and joint actuators with actuator control loops. The invention decomposes the task into behavior kinematic quantities of plural behaviors to be exhibited simultaneously in respective behavior spaces by the robot, transforms the behavior kinematic quantities from the respective behavior spaces to a common space and computes, in the common space, from the behavior kinematic quantities command kinematic quantities and controls the actuators in accordance with the command kinematic quantities.

The computing of the command kinematic quantities is accomplished by computing a first command kinematic quantity for the next sampling interval from (a) the simultaneous behavior kinematic quantities and (b) other command kinematic quantities of the current sampling interval and computing the other command kinematic quantities for the next sampling interval from the first command kinematic quantity of the next sampling interval and from the other command kinematic quantities of the current sampling interval.

In a first embodiment of the invention, the first command kinematic quantity includes commanded acceleration and the other command kinematic quantities include commanded velocity and commanded position, while the behavior kinematic quantities include behavior forces, behavior accelerations, behavior velocities and behavior positions.

In a second embodiment of the invention, the first command kinematic quantity includes commanded velocity and the other kinematic quantities include commanded acceleration and commanded position.

The common space is a motion space common to which all of the behavior kinematic quantities are transformable. This requires transforming at least some of the command kinematic quantities from the motion space to an actuator space of the actuators before applying them to control the actuators.

The robot further includes joint position sensors for detecting positions of the joints and the transform to the actuator space is based upon the current angles of the joints detected by the joint position sensors.

The decomposing of the task defines the behavior kinematic quantities of each of the behaviors in respective behavior spaces of each of the behaviors, requiring transforming the behavior kinematic quantities of each respective behavior from the corresponding behavior space to the motion space. Each respective behavior space has a dimensionality corresponding to respective degrees of freedom of the robot not exceeding the maximum number of degrees of freedom of the arm. The behaviors can include trajectory control, force control singularity avoidance, joint limit avoidance, obstacle avoidance, teleoperation, dither motion and manipulability.

Where one of the behavior is avoidance of one of a joint limit, joint singularity or obstacle, the corresponding behavior kinematic quantity is a function of the proximity of the joint limit, joint singularity or obstacle, respectively. Each of the behaviors is governed in accordance with a corresponding input parameter of the type including force set points, joint singularity angle, joint limit angle, obstacle location and the like, and the input parameters are reprogrammable each sample interval, whereby to provide dynamical control the plural behaviors.

The command kinematic quantities include acceleration, velocity and position, the behavior kinematic quantities include force, acceleration, velocity and position, and the computing of the first command kinematic quantity is performed by equating a sum of proportionate differences between command and behavior accelerations, velocities and positions, respectively, with a sum of measured forces of the robot and of behavior forces. The differences are proportionate in accordance with inertia, damping and stiffness characteristics, respectively, of the robot.

DETAILED DESCRIPTION OF THE PREFERRED EMBODIMENT

Control architecture for multiple simultaneous behaviors

Figure 1:
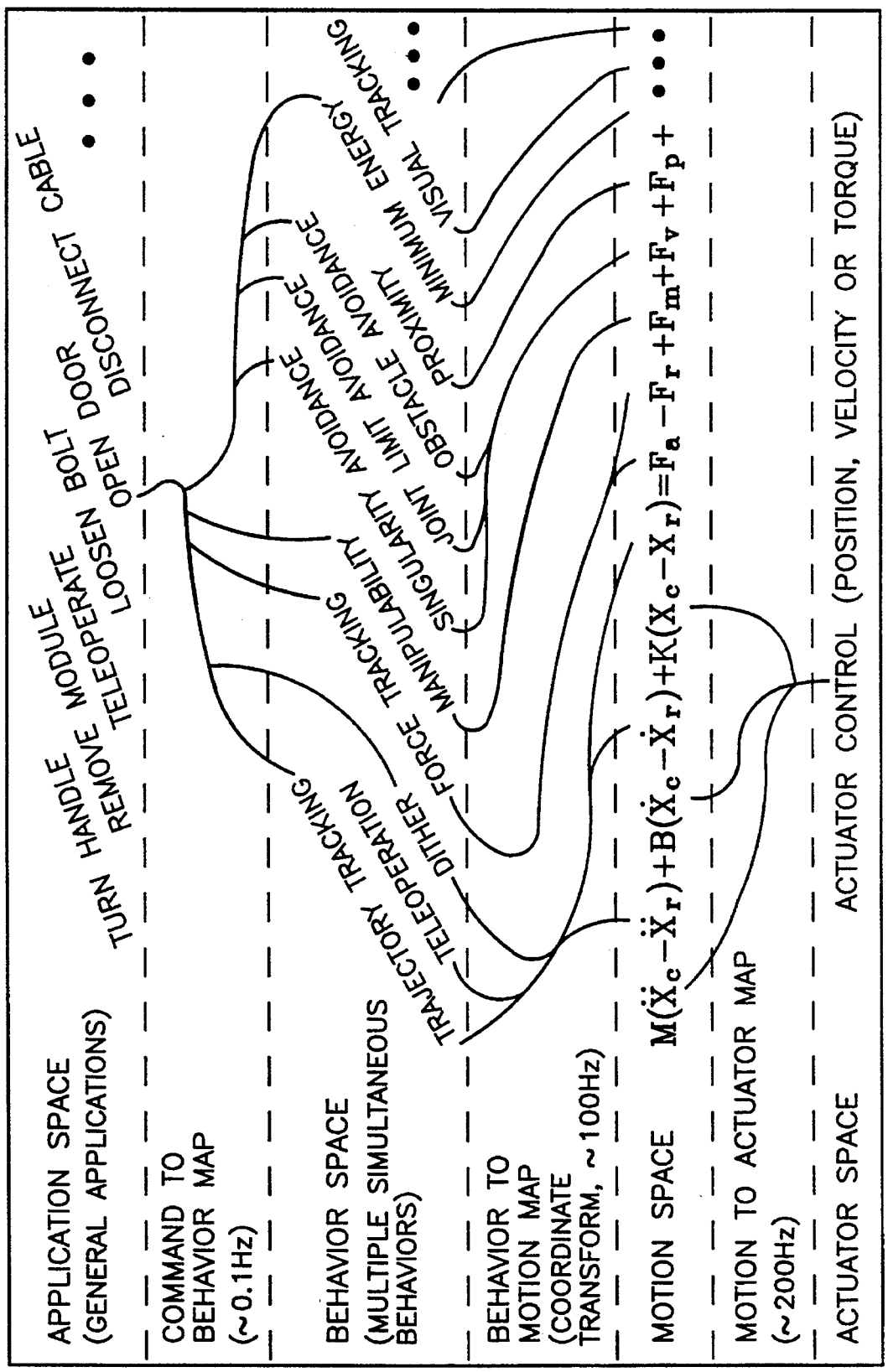
FIG. 1 is a diagram illustrating the task decomposition into simultaneous behaviors and the computation of control commands in motion space.

The control architecture for simultaneous execution of multiple control behaviors is shown in FIG. 1. The Application Space includes all potential application tasks which the robot control system must be able to accomplish. These application tasks could be sequenced together to accomplish a larger task. Execution of a given application task can be decomposed into concurrently executing behaviors. For example, a door opening task could utilize a trajectory generator to generate the nominal trajectory while force control adds small perturbations to adjust for errors between the planned trajectory and the physical system motion. The Command To Behavior Map performs the mapping between the task and the required concurrent behaviors. This could be done automatically or through interaction with an operator.

The Behavior Space includes all of the independent control behaviors. Trajectory Tracking is a control behavior which provides a trajectory generator to generate real-time trajectories. The Teleoperation behavior takes real-time operator inputs and generates control inputs. Dither generates small periodic dither control inputs. Force Tracking provides control of contact forces between the manipulator and the environment. Manipulability computes an optimum arm configuration and generates control inputs to move toward it. Singularity Avoidance generates control inputs to keep the arm away from singularities. Joint Limit Avoidance generates control inputs to keep the arm away from joint limits. Obstacle Avoidance generates control inputs to prevent collisions. Proximity generates control inputs to control proximity to a real or virtual object. Visual Tracking generates control inputs to provide visual servoing. Other behaviors could also be provided. Each behavior has command parameters that specify its operation and use of real and virtual sensor data. Virtual sensors are those that derive data, possibly from real sensors, e.g., a joint limit or singularity sensor derives data from real joint position sensors.

More complex resultant behaviors can be generated by concurrent execution of individual behaviors. For example, a polishing behavior may be composed of teleoperation, force tracking, manipulability, joint limit avoidance, obstacle avoidance, and singularity avoidance behaviors. Teleoperation could allow motion inputs by an operator only tangential to the surface normal. Force tracking could provide a constant force against the surface. Manipulability could control the arm configuration for optimal control of fine forces. Joint limit avoidance, obstacle avoidance and singularity avoidance would keep the arm from collisions and singularities. The operator would then only have to provide the motion over the surface. The autonomous system would provide the rest of the control.

The Motion Space is the common control space for all behaviors. Mechanisms with more than six mechanical DOFs have been referred to as kinematically redundant since the classical problem of end-effector position and orientation control for a spatial manipulator can be handled by a six DOF robot. Task requirements often dictate a task space of dimension greater than six. For so called kinematically redundant robots, a motion space is defined that spans all of the mechanical DOFs. The motion space of the seven DOF manipulator used here includes a six DOF coordinate frame (the MOTION frame), and an "arm angle" parameter which describes the internal configuration of the arm. The arm angle, represented by $\psi$, is defined as the angle between the plane passing through the shoulder, elbow, and wrist points and some reference plane; The vertical plane is chosen here.

Each motion DOF can receive inputs from multiple behaviors. Motion Space control is done here using impedance control [1] but with the expanded ability to merge multiple control inputs either as position inputs or force inputs. In addition, the impedance equation can be extended beyond six DOFs to match the dimension of the motion space. The motion space impedance control equation, as shown in FIG. 1, is $$M.(\ddot{X}_c - \ddot{X}_r) + B.(\dot{X}_c - \dot{X}_r) + K.(X_c - X_r) = \Sigma F_i \quad (1)$$

where M is the inertia matrix, B is the damping matrix, K is the stiffness matrix, $X_r$ is the sum of the commands from the position based behaviors, $X_c$ is the commanded position, and $\Sigma F_i$ is the sum of all behavior inputs mapped to forces. For example, $$\Sigma F_i = F_a - F_r + F_t + F_j + F_s \quad (2)$$

where $F_a$ is the actual measured force, $F_r$ is the reference (desired) force, $F_t$ is the virtual force from the teleoperation inputs, $F_j$ is the virtual force for joint limit avoidance, and $F_s$ is the virtual force for joint singularity avoidance (or $F_{singularity}$ below).

Position based behaviors generate $X_r$, $\dot{X}_r$, and $\ddot{X}_r$. The trajectory generator generates the reference trajectory, $X_g$, $\dot{X}_g$, and $\ddot{X}_g$. Various trajectory generators can be used. The one used for this implementation can be found in [7]. An alternative trajectory generation scheme is describe below. Other position based behaviors generate velocities which are added to the trajectory generator velocity term. Therefore, $$X_r = X_g \quad (3)$$

$$\dot{X}_r = \dot{X}_g + \Sigma \dot{X}_i \quad (4)$$

$$\ddot{X}_r = \ddot{X}_g \quad (5)$$

For example, $$\Sigma \dot{X}_i = \dot{X}_d + \dot{X}_l \quad (6)$$

where $\dot{X}_d$ is the velocity due to a dither signal and $\dot{X}_l$ is the velocity generated for proximity control. An important feature of position based behaviors is that they can be generated in a Cartesian frame different than the MOTION frame. The velocities in the separate behavior frames for the position based behaviors can be transformed to equivalent velocities of the MOTION frame using rigid body kinematics.

Equation 1 is implemented with $$\ddot{X}_c^{n+1} = \ddot{X}_r^{n+1} + M^{-1} \cdot [\Sigma F_i^n - B.(\dot{X}_c^n - \dot{X}_r^{n+1}) - K.(X_c^n - X_r^{n+1})] \quad (7)$$

$$\dot{X}_c^{n+1} = \dot{X}_c^n + \ddot{X}_c^{n+1} \Delta \tau \quad (8)$$

$$X_c^{n+1} = X_c^n + \dot{X}_c^{n+1} \Delta \tau \quad (9)$$

where $\Delta \tau$ is the sample interval, and the post superscript indicates the sample interval, i.e., n is the present sample interval and n+1 is the next sample interval. This gives the desired acceleration of the mechanism in the Motion Space. The velocity motion commands are mapped into the actuator space of the mechanism as described below.

The Actuator Space is defined as the space of active actuation of the mechanism. Mechanisms which have more than six actuator DOFs fall into two general categories, kinematically redundant and actuationally redundant. Typically, kinematically redundant mechanisms have additional behaviors associated with position and actuationally redundant manipulators have additional behaviors associated with force [4]. For most applications the motion space should completely span the actuator space of the manipulator to provide the widest array of behaviors for task execution. The mapping is then one-to-one and common Jacobian transpose and Jacobian inverse techniques apply. If there are more DOFs in the actuator space than in the motion space, the mapping is underconstrained and a variety of techniques can be used including pseudo-inverse or minimum kinetic energy [4]. Conversely, if there are fewer DOFs in the actuator space than the motion space, the problem is overconstrained and damped least-squares [8, 9] and other techniques are available. Care must be taken to assure that a one-to-one mapping between motion space and actuator space does not degenerate at or near a singularity.

Although Jacobian inverse routines could be used, a damped-least squares inverse is used here to allow further task prioritization and singularity robustness [8, 9, 5, 10, 6]. The motion space velocity vector of the manipulator has three translational coordinates, three orientation coordinates and the arm angle. A composite Jacobian is formed from the individual Jacobians that relate the rate of change of the joint angles to the rate of change of the motion space parameters. Here the composite Jacobian, $J^C$, is given by [6]:

$$J^C_{7\times 7} = \begin{pmatrix} J^{\omega}_{3\times 7} \\ J^{\upsilon}_{3\times 7} \\ J^{\psi}_{1\times 7} \end{pmatrix} \quad (10)$$

where $J^{\omega}$ is the angular velocity Jacobian, $J^{\upsilon}$ is the linear velocity Jacobian, and $J^{\psi}$ is the arm angle Jacobian. $J^{\omega}$ and $J^{\upsilon}$ are readily available using:

$$\begin{pmatrix} J^{\omega}_r \\ J^{\upsilon}_r \end{pmatrix} = \begin{pmatrix} \hat{z}_1 & \hat{z}_2 & \ldots & \hat{z}_7 \\ \hat{z}_1 \times P_{1,r} & \hat{z}_2 \times P_{2,r} & \ldots & \hat{z}_7 \times P_{7,r} \end{pmatrix} \quad (11)$$

where r is the velocity reference point, $\hat{z}_i$ is the z axis of joint i, and $P_{i,r}$ is the position vector from the ith link frame to the velocity reference point r. The arm angle Jacobian is available from [6]:

$$J^{\psi} = \frac{(\hat{w} \times p)^T}{\|p\|^2} E + \left\{ \frac{\hat{V}^T_w}{\|h\|^2} (\hat{w} \times h)^T - \frac{\hat{w}^T e}{\|w\| \|p\|^2} (\hat{w} \times p)^T \right\} W \quad (12)$$

where $w=P_{0,7}$, $e=P_{0,4}$, $P=e-\hat{w}(\hat{w}^T e)$, $V_T$ is the vector specifying the reference plane, $h=(w\times\hat{V})\times w$, E is the elbow linear velocity Jacobian, and W is the wrist linear velocity Jacobian. Notice that most of the required data for $J^c$ is available as a by product from a forward kinematic iteration [6].

With the motion space command vector, $\dot{X}_c$, and the motion to actuator space map, $J^C$ the joint servo velocity commands can be computed using damped-least squares with $$\theta_d 32 \; [J^T.W_T.J+W_V]^{-1}.J^T.W_T.\dot{X}_c \quad (13)$$

where $W_T$ is a diagonal task weighting matrix that relates the relative priorities of the tasks. $W_V$ is a diagonal velocity weighting matrix which weights the norm of joint velocities. It is important to note that while a non-zero $W_V$ matrix will provide robustness to singularities by limiting excess joint velocities, it will also induce tracking error over the entire workspace. By setting $W_T$ to identity and $W_V$ to zero a standard inverse Jacobian result is provided with the same algorithm. The present implementation utilizes joint position servos so the joint velocity commands are integrated to generate the joint position commands.

Previous approaches to redundancy resolution include pseudoinverse and augmented (or composite) Jacobian methods. A wide variety of pseudoinverse approaches have utilized projection operators on the null space of the end-effector Jacobian to resolve the redundancy. These methods cannot in general guarantee cyclic or conservative motion and more importantly often cannot guarantee direct control of the entire mechanism. This often results in some unspecified internal motion of the mechanism. These methods also rely heavily on optimization functions to resolve the redundancy with only local results and often with objective functions of questionable utility to the task at hand. Augmented Jacobian methods focus on defining kinematic functions that provide forward and differential kinematic relationships to attempt to fully specify the motion of all degrees of freedom of the mechanism. These approaches have been fairly successful [5, 6, 11] but still have some difficulties. Often the forward kinematic relationships are difficult to compute and may not be defined over the entire workspace. Additionally the majority of these functions do not have closed form Jacobian relationships and require numerical techniques for computation. Many of the problems with artificial singularities of these new kinematic functions and discontinuities in switching from one function or subtask have been addressed using damped least, squares for position controlled applications [12, 5, 6]. However, damped least squares with joint velocity weighting introduces tracking error throughout the workspace and requires the selection of weighting matrices which is often non-intuitive. Many of these issues have not been addressed for force or impedance control applications.

The approach to control of kinematically redundant manipulators described here uses a task space of the same dimension as the robot. This is desirable from the standpoint of directly controlling all degrees of freedom and eliminating uncontrolled internal motions which can pose safety, collision, and cyclicity problems. Additionally it is desirable to make use of all available degrees of freedom to complete kinematically challenging tasks in unstructured environments that may not, be part of t, he planned suite of capabilities.

The task space parameterization does not change over time. Instead an impedance model is applied to the full dimension of the task space and shared control techniques are used to combine real and virtual sensory inputs to the impedance model. In this way, degree(s) of freedom normally referred to as redundant are unified with the task space and reference trajectories as well as sensor data cause motion of the entire mechanism. Additionally since the task space parameterization is fixed, issues of switching discontinuity do not arise and singular regions associated with the task space parameterization are fixed. The entire task space of the manipulator can be used to accomplish tasks as motion is mapped to the appropriate degrees of freedom. Thus on-line numerical techniques are not required to compute differential (Jacobian) relationships. When operating in these regions potential fields may be applied to the impedance model to inhibit movement in the singular or increasingly singular directions. Alternatively, if position based impedance control is being used, the damped least squares methods can be used with the tracking error producing velocity weighting only active in the singular regions. The parameterization of redundancy discussed here generally have some physical significance, however, there also exist a wide variety of kinematic arrangements that may not have a "natural" redundancy parameter that has physical significance or spans a significant portion of the workspace. In such cases one can rightly inquire into the motivation behind such a design from a task execution perspective and determine the minimum set of parameters that will completely describe the configuration of the manipulator.

Individual behaviors

As shown in FIG. 1, various individual behaviors can execute concurrently. A behavior can generate either position commands, which are merged with the reference position trajectory on the left side of Equation 1, or force commands which are merged with $\Sigma F_i$ on the right hand side of the equation.

Teleoperation

Teleoperation is shown as a position based input in FIG. 1 but is implemented in the present system as a force based input, related to input velocities. The input velocity motion by the operator with a six DOF hand controller is transformed to equivalent velocities, $\dot{X}_h$, based upon the selected teleoperation mode (see Appendix). These velocities are multiplied by a damping matrix, $B_t$, to compute the equivalent forces with $$F_t = B_t \dot{X}_h \tag{14}$$

The damping matrix, $B_t$, can be used to select operator input directions. The operator inputs arm angle velocity by pressing a trigger on the hand controller and changes the sign by pressing a button on the hand controller. The transformations are seven dimensional so the input arm angle from the hand controller is also transformed to a force in the motion space.

Force control

Forces are often not controlled directly with impedance control. Rather, a position setpoint is specified inside an object and the actual steady state applied force is a function of both the target stiffness and the position error. This approach is available with this implementation, but an alternative approach has also been implemented. In the alternative approach, a reference (desired) force is specified and the difference between the reference and actual forces is used on the right side of Equation 1. Then exact force control is possible by setting the reference stiffness, K, and the reference trajectory velocity and acceleration to zero in force controlled DOFs. Assuming that the environment can be modeled as a stiffness with spring constant $k_{env}$, the applied force in a DOF will be $$f_a = k_{env}(x_r - x_c) \tag{15}$$

where $x_r$ is the position at the initial contact point. If $x_e = x_c - x_r$, then the impedance equation (with no stiffness) for this DOF is $$m\ddot{x}_e + b\dot{x}_e = -k_{env}x_e - f_r \tag{16}$$

In steady state the desired and actual applied forces will be equal for any target impedance parameters which provide stable contact for the characteristic equation $$ms^2 + bs + k_{env} = 0 \tag{17}$$

where m is the mass term of M, b is the damping term of B, and $k_{env}$ is the stiffness in the force controlled DOF. Either approach to control of forces is available if the difference between the reference and actual forces is added to the right hand side of Equation 1. This is shown in FIG. 1 with the difference $F_a - F_r$.

Trajectory Generator

The trajectory generator behavior computes the reference trajectory acceleration $\ddot{X}_g$, velocity $\dot{X}_g$, and position $X_g$. The arm angle is also generated as part of the trajectory. An alternative trajectory generation scheme has also been implemented. Here $\ddot{X}_g = \dot{X}_g = 0$ and the reference position, $X_r$, is set to be the desired final position. The stiffness term of the impedance equation then causes the arm to move to the destination. A slight drawback with this "spring" trajectory is that the motion accelerates quickly initially and then approaches the destination slowly. This is fixed by putting a nonlinear filter on the stiffness error, $(X_c - X_r)$. Maximum "spring lengths" corresponding to the X, Y, and Z translational components of the difference, the equivalent angle of rotation of the orientational component, and the arm angle component are given as parameters in the task command. The corresponding components of $(X_c - X_r)$ are limited to these input parameters during control.

Joint Limit Avoidance

Joint travel limiting provides an artificial potential field at the end of travel limits on each joint. This field is then mapped to the motion space to resist operator commands that exceed joint limits. While the local site path planner can predict and avoid joint limits in its commands, often the operator using teleoperation cannot. The joint travel limiting sensor resists this motion so the operator does not induce a fault condition which would interrupt the current task.

As a joint limit is approached, a joint velocity is computed, $\dot{\theta}_i$, based upon a repelling force.

$$\dot{\theta}_i = \frac{k_{\theta i}}{\theta_{actuali} - \theta_{limiti}} \tag{18}$$

where $k_{\theta i}$ is the gain for joint limit i, $\theta_{actuali}$ is the actual joint angle, and $\theta_{limiti}$ is the limit that the joint is approaching. The velocities corresponding to all the joints are placed in the vector $\dot{\theta}_j$. The task space virtual forces for joint limit and joint singularity avoidance are then computed with $$^{MOTION}F_j = B_j \cdot {}^{MOTION}_{TN}J \cdot {}^{TN}J_{TN} \cdot \dot{\theta}_j \tag{19}$$

There are two types of Jacobians used in Equation (19), a Jacobian relating Cartesian velocities at two different frames attached to the same rigid body, $$^{MOTION}_{TN}J,$$

and a Jacobian which relates joint space velocities to Cartesian velocities, $^{TN}J_{TN}$. The MOTION frame is the frame where Equation 1 is evaluated. $B_j$ is a damping matrix converting Cartesian velocities to forces. To provide the joint limit avoidance behavior as a velocity input (a term of $\Sigma \dot{X}_i$ in Equation 6), the $B_j$ term would be removed leaving a task space velocity. A force implementation may also be used where the repelling perturbations are computed as joint space forces rather than the velocities of Equation (18).

Singularity avoidance and robustness

Similar to the joint travel limiting behavior is the behavior which limits motion in the manipulator workspace singular regions. Information in joint space or motion space about the singular regions is required. Some singular regions are qualitatively located at joint limits; these are taken care of by the above behavior. Others are located throughout the workspace; for example, the robot of the present implementation has singularities at configurations when the seventh joint frame is within 0.2 meters or beyond 1.1 meters of the first joint frame. Thus if $\|^0P_7\| > 1.1$ meters then $$F_{singularity} = -(^{motion}_{7}T_f) \cdot K_{singularity} \cdot (\|P_{actual}\| - 1.1) \cdot \hat{P}_{actual} \quad (20)$$

or if $\|^0P_7\| < 0.2$ meters then $$F_{singularity} = -(^{motion}_{7}T_f) \cdot K_{singularity} \cdot (0.2 - \|P_{actual}\|) \cdot \hat{P}_{actual} \quad (21)$$

where $K_{singularity}$ is the gain for the singular region avoidance, $$^{motion}_{7}T_f$$

is the rigid body transformation between the joint 7 frame and the motion space coordinate system. $P_{actual}$ is the actual current position of the joint seven frame, $\hat{P}_{actual}$ is the unit vector in the direction of $P_{actual}$, and $F_{singularity}$ is the singular region avoidance behavior command in the motion space. Note that if the manipulator is not near a singular region there is no commanded motion from this behavior.

In space or other unstructured environments unexpected events may cause the need to operate the robot in singular regions. This can be accomplished by setting a non-zero $W_\upsilon$ in Equation 13. However this induces undesired tracking error in non-singular regions. To eliminate this tracking error in non-singular regions, yet allow motion in singular regions, $W_\upsilon$ is set with:
if $\|^0P_7\| > 1.1$ meters then $$W_\upsilon = K_{robustness}(\|P_{actual}\| - 1.1) \quad (22)$$

or if $\|^0P_7\| < 0.2$ meters then $$W_\upsilon = K_{robustness}(0.2 - \|P_{actual}\|) \quad (23)$$

where $K_{robustness}$ is the gain for singularity robustness. Again, if the manipulator is not near a singular region, $W_\upsilon$ is zero and there is no tracking error.

Dither

Dither inputs are incorporated to reduce the effects of friction in tight tolerance tasks. A triangular dither wave function is provided with input parameters specifying its amplitude and period as well as the Cartesian frame in which to compute the waveform. Other waveforms could be used. The dither input, $\dot{X}_d$, provides a velocity input to Equation 6 or could generate a force input by multiplying by a damping matrix.

Proximity

Proximity sensor control is implemented to provide both control of distance to a surface as well as tilt relative to the surface. The sensor provides both distance (one dimension) and tilt (two dimensions) information of the surface relative to the sensor. The distance and tilt error data can be converted to equivalent velocities, $\dot{X}_l$, for virtual forces by multiplying by a damping matrix.

The proximity sensor control frame, L, (specified separately from the MOTION frame when proximity control is input as a position based behavior, i.e., the velocity is generated to be summed in Equation 6) is specified such that its $\hat{z}$ axis is along the distance measuring axis of the sensor. If the proximity control is input as a force based behavior, then the L and MOTION frames are the same. Therefore, two gains are required for control: one for distance and one for orientation. Orientation (tilt) control is accomplished by determining the angle and axis of rotation equivalent to the error in tilt returned by the sensor. If the equivalent axis of rotation error is $\hat{u}$ and the equivalent angular error is $\theta$, then the corrective orientation velocity (3 vector) is $$^L\dot{X}_{l\theta} = -k_\theta \theta \hat{u} \quad (24)$$

where $k_\theta$ is the orientation gain. The translational velocity is given by $$^L\dot{X}_{ld} = \begin{bmatrix} 0 \\ 0 \\ k_d(d_r - d_l) \end{bmatrix} \quad (25)$$

where $k_d$ is the translational gain, $d_r$ is the reference distance, and $d_l$ is the actual measured distance. The velocity vector in the L frame for the proximity sensor is therefore $$^L\dot{X}_l = \begin{bmatrix} ^L\dot{X}_{l\theta} \\ ^L\dot{X}_{ld} \end{bmatrix} \quad (26)$$

which is transformed to an equivalent velocity vector in the MOTION frame.

Bounded behavior execution

The control scheme for concurrent behaviors merging has been developed for space flight applications (although it is applicable to terrestrial applications). Therefore it as been implemented with a fixed software system as described below with reference to a laboratory implementation.

An additional feature which is necessary for execution of tasks in a remote space environment is bounded behavior control execution. The multiple concurrent behaviors are merged together to generate the resultant behavior. This resultant behavior must then be monitored during execution to make sure that it stays within specified bounds for safety. The local site can plan tasks and simulate the execution on a local simulator, but cannot be sure of the motion generated by real-time sensor based motion. To ensure safety the local site can specify and verify safety of tasks which execute within specified bounds. These bounds may include the difference between the reference trajectory and the actual trajectory, force thresholds, and proximity thresholds. As long as the execution progresses within the specified bounds, it should be safe.

IMPLEMENTATION OF THE INVENTION

Figure 2:
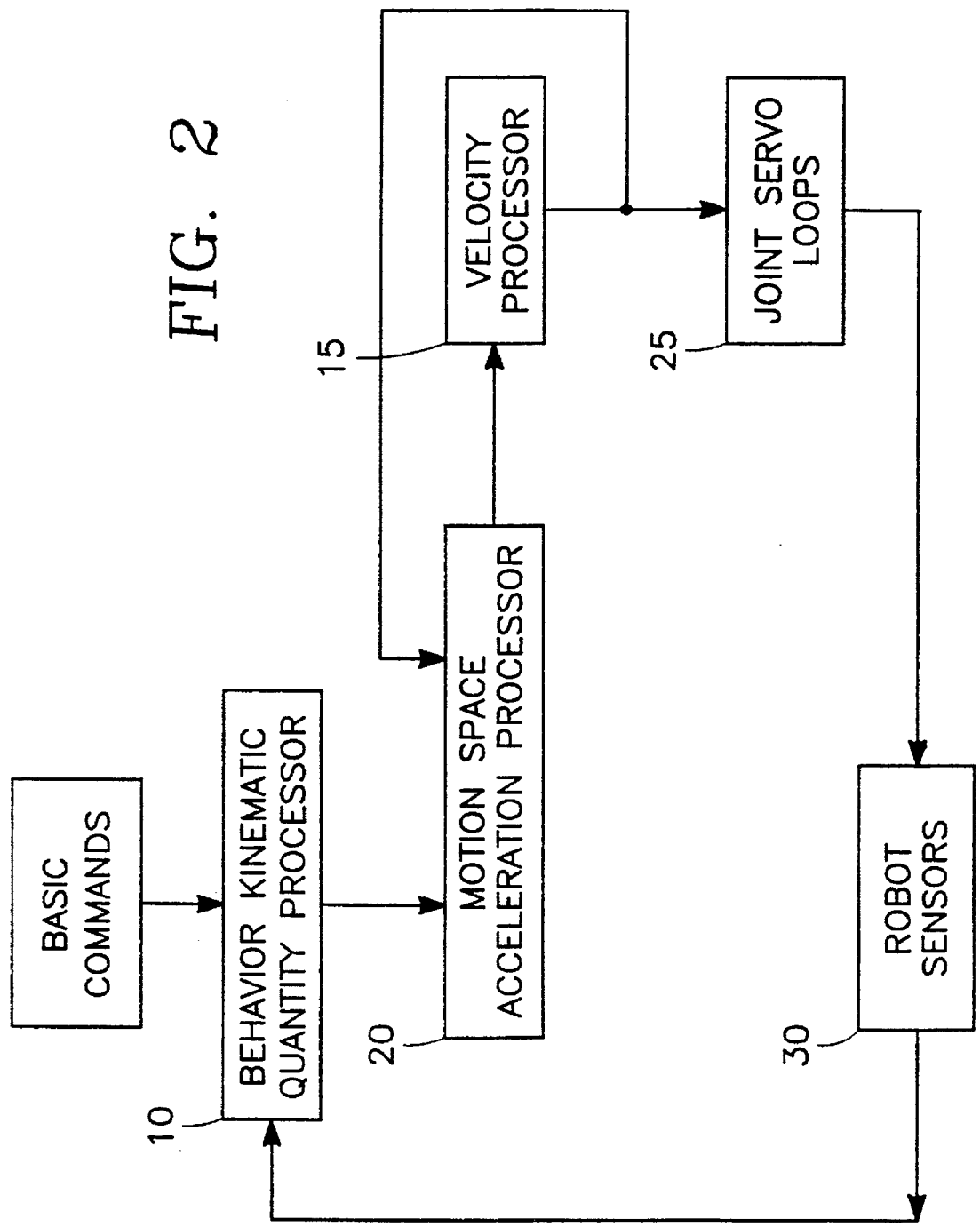
FIG. 2 is a block diagram of a system architecture embodying the invention and corresponding to FIG. 1.
Figure 3:
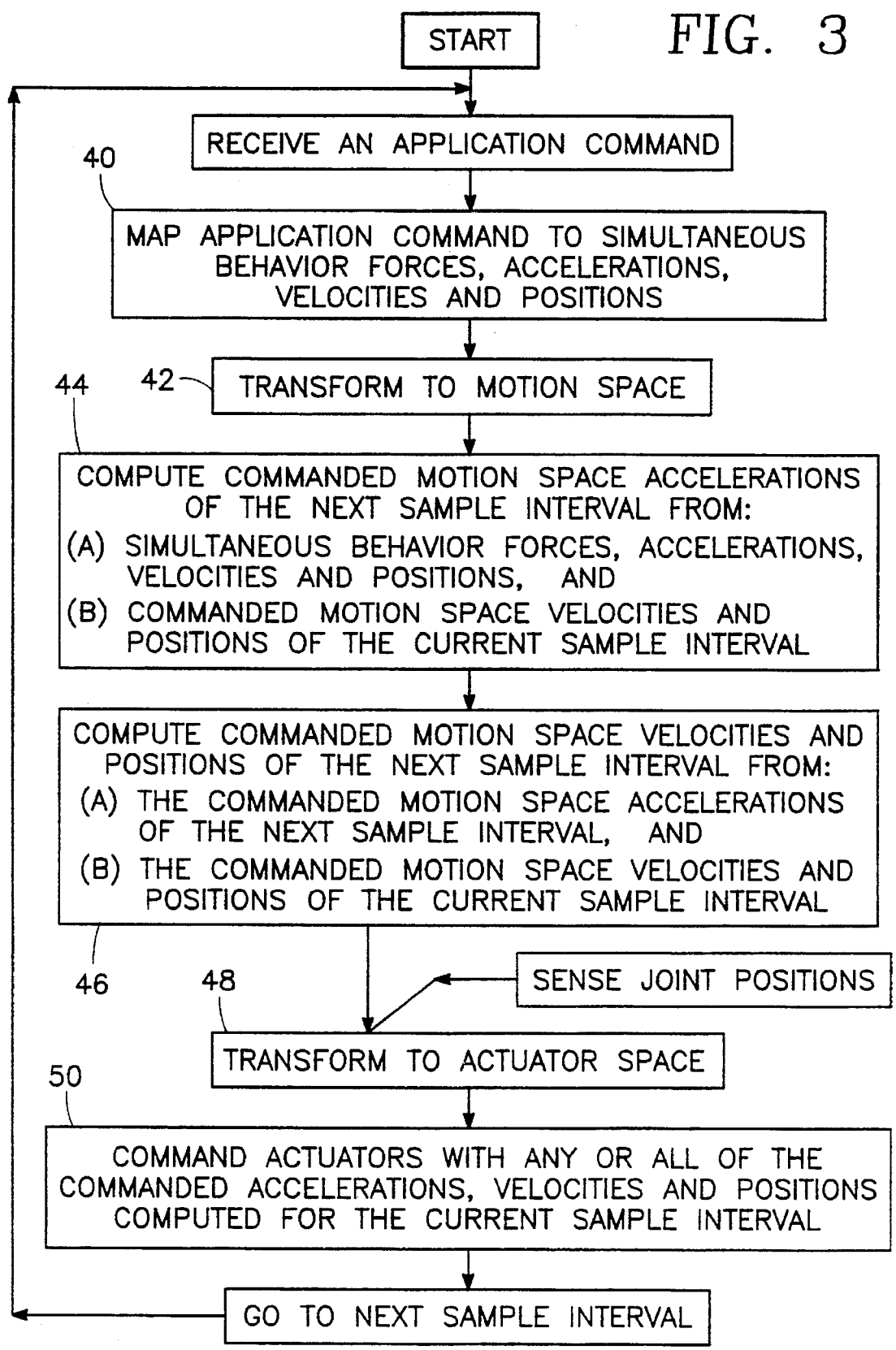
FIG. 3 is a flow diagram illustrating the operation of the system of FIG. 2.

FIG. 2 illustrates one implementation of the invention and FIG. 3 illustrates the operation of the apparatus of FIG. 2 during one sample interval. The invention may be thought of being divided among a number of processors, including a behavior kinematic processor 10, a velocity processor 15, an acceleration processor 20, joint servo loops 25 and robot position and force sensors 30. In operation, the behavior kinematic processor 10 decomposes a received task command into plural behaviors consisting of various behavior kinematic quantities including forces, accelerations, velocities and positions in respective behavior coordinate systems or spaces (block 40 of FIG. 3). The behavior kinematic processor 10 transforms these quantities to a common motion space to which all of the behaviors are transformable (block 42 of FIG. 3). The acceleration processor 20 computes command accelerations for the next sample interval from all of the behavior kinematic quantities as well as from command velocities and positions of the current sampling interval (block 44 of FIG. 3). The velocity processor 15 computes the command velocities and positions of the next sample interval from the command accelerations of the next sample interval and from the command velocities and positions of the current sample interval (block 46 of FIG. 3). At least one of the commanded accelerations, velocities or positions of the current sample interval is transformed to an actuator space of the robot (block 48 of FIG. 3), and applied to the joint servo loops 25 (block 50 of FIG. 3). (In the main embodiment described herein it is the commanded acceleration, while in an alternative formulation described below it is the commanded velocity which is applied to the joint servo loops.) Thereafter, the next sampling interval commences.

Laboratory implementation

The data driven merging of concurrent behaviors for a redundant manipulator has been developed for control of Space Station manipulators. The development and implementation has been clone in the JPL Supervisory Telerobotics (STELER) laboratory. The STELER lab telerobot system is composed of a local site where task commands are specified by an operator with a graphical interface [13] and a remote site where the commands are executed [14]. The remote site was developed to be able to execute multiple concurrent behaviors as described by local site command parameterization, and has been implemented in Ada to be consistent with language constraints for Space Station systems. The system currently uses a seven DOF Robotics Research Corporation K-1207 dextrous manipulator with a six DOF LORD force-torque sensor at the wrist and a servoed gripper. Autonomous commands are generated with the local site system and sent for execution at the remote site. For teleoperation and shared control tasks, the operator uses a six DOF hand controller. The system is implemented in a six CPU 68020/68881 environment and generates joint position commands each 20 ms which are sent to the manufacturer controller which supplies the joint servo control.

Results

Figure 4:
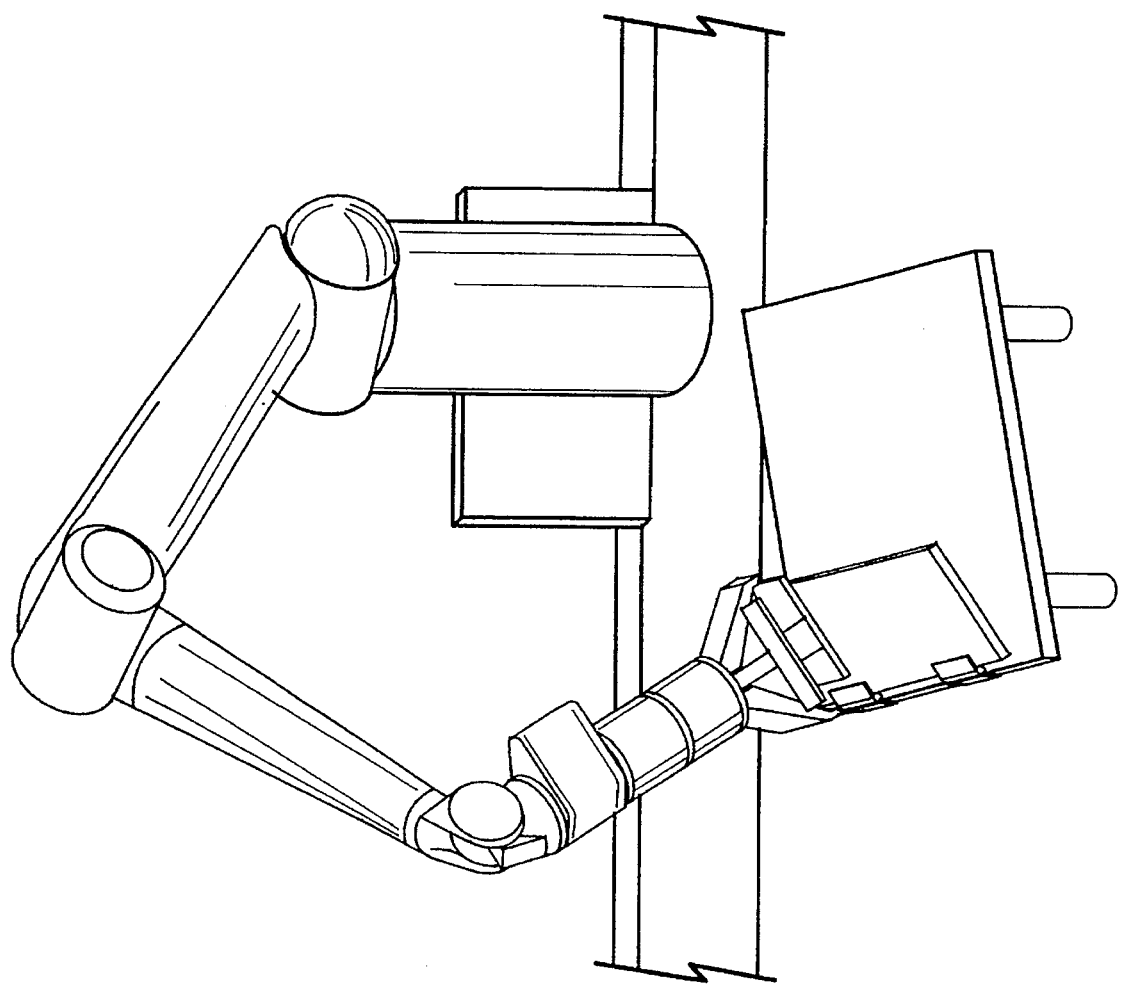
FIG. 4 is a photograph of a door opening task performed by the invention.

A door opening task, as shown in FIG. 4, is used to demonstrate the use of different control inputs to execute a task. FIGS. 5–10 show experimental results opening the door using shared control, force control, and the spring trajectory. In all three cases the motion frame, where the impedance equation is evaluated, was placed such that its X axis was aligned with the hinge axis. The diagonal M matrix had translational masses of 10 kg and rotational inertias of 2 kg-m². The diagonal B matrix had translational gains 350 kg/s and rotational gains of 80 kg-m/s. The diagonal K matrix had translational gains 100 N/m and rotational gains of 10 N/rad.

Figure 5:
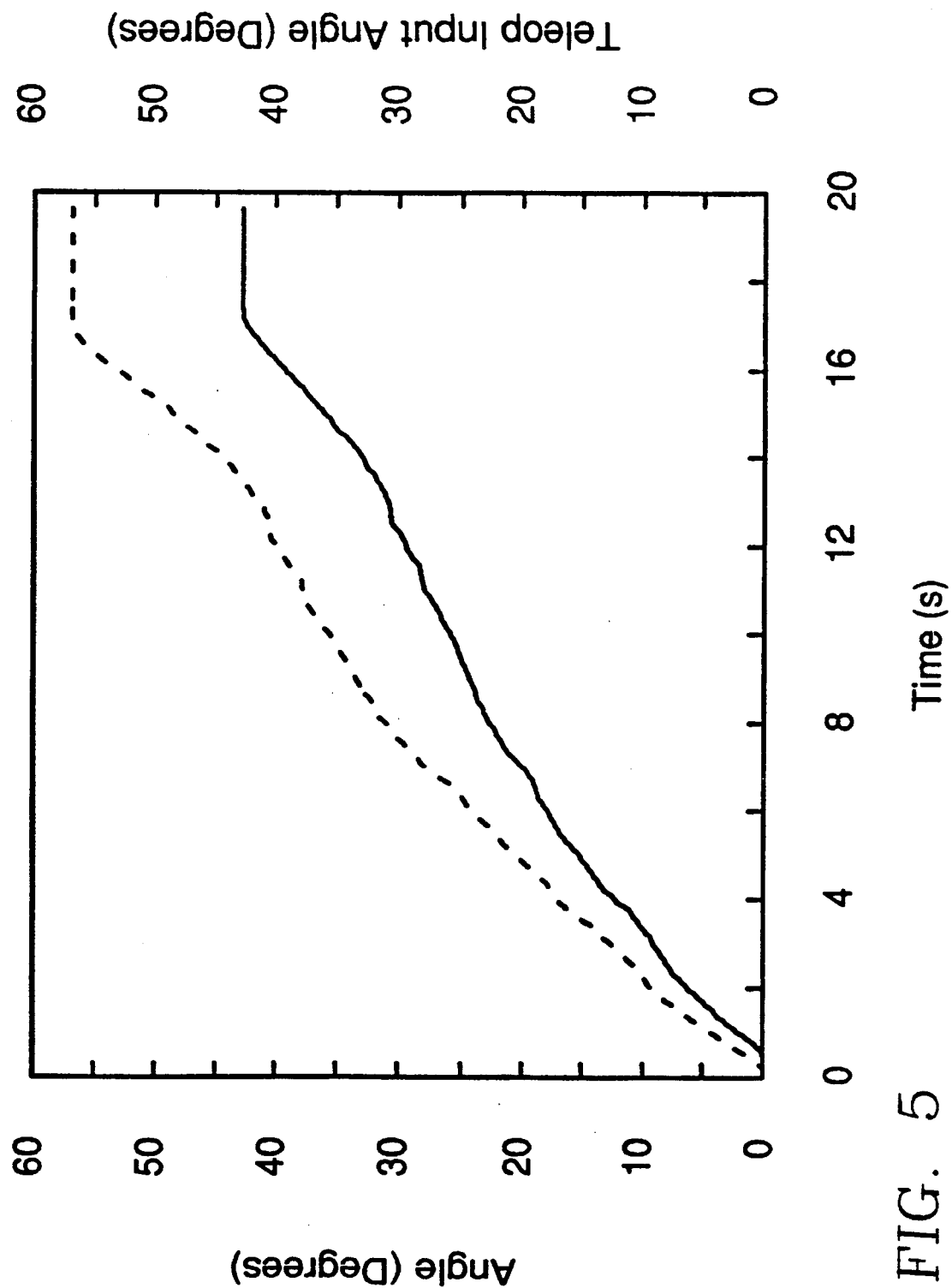
FIG. 5 is a graph of angle as a function of time in a door opening task performed by the invention using shared control in which the solid line is the door rotation about the MOTION frame X axis (hinge axis) and the dashed line is the integrated teleoperation input angle.
Figure 6:
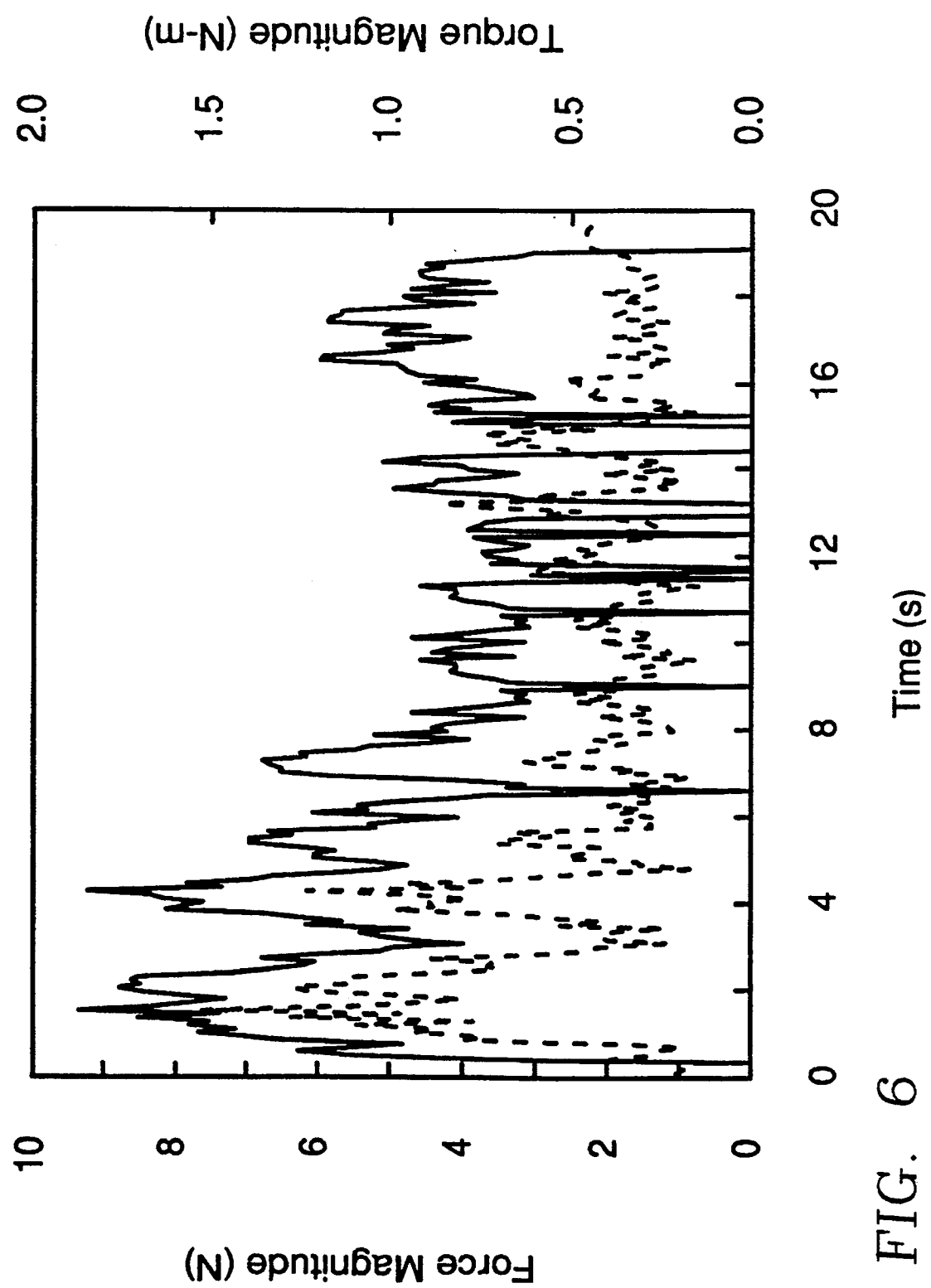
FIG. 6 is a graph of force and torque magnitudes over time in the door opening task using shared control in which the solid line is the force vector magnitude in the MOTION frame and the dashed line is the torque vector magnitude in the MOTION frame.

For shared control door opening, the M and B parameters of the impedance equation were specified and the K matrix was set to zero. The reference force setpoints were all set to zero so that force control would provide compliance to accommodate for inaccuracies in the teleoperated motion of the robot. Tool mode teleoperation of the hand controller was used with the mapping set such that a one DOF rotation of the hand controller wrist was mapped to a rotation about the MOTION frame X axis. The diagonal $B_t$ matrix was set to zero except for the X rotation component so the operator could only specify rotation about the hinge axis. The results of the door opening task using shared control are shown in FIGS. 5 and 6.

Figure 7:
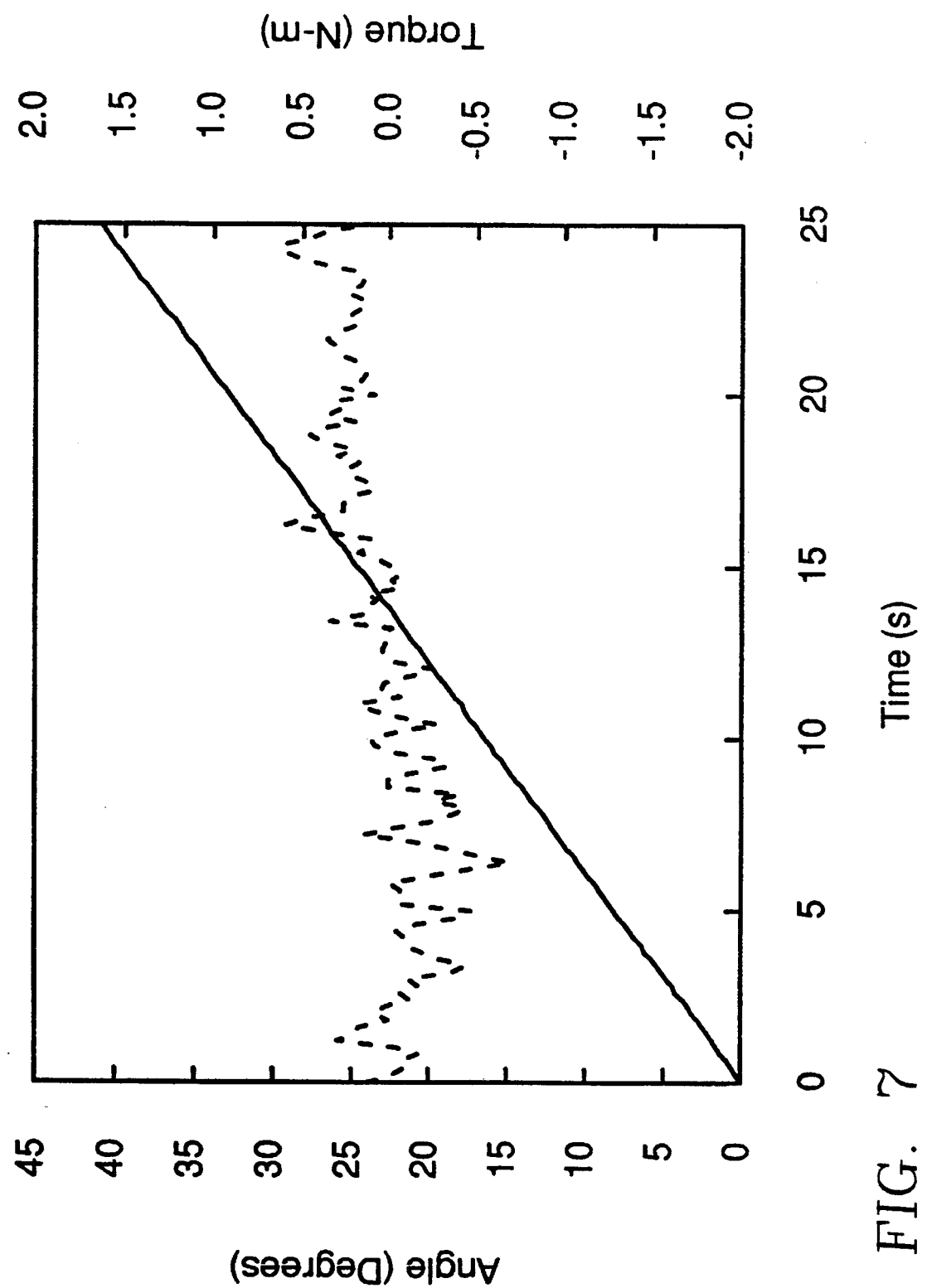
FIG. 7 is a graph of a door opening task performed by the invention using force control, in which the solid line is the door rotation about the MOTION frame X axis (hinge axis) and the dashed line is the torque about the MOTION frame X axis.
Figure 8:
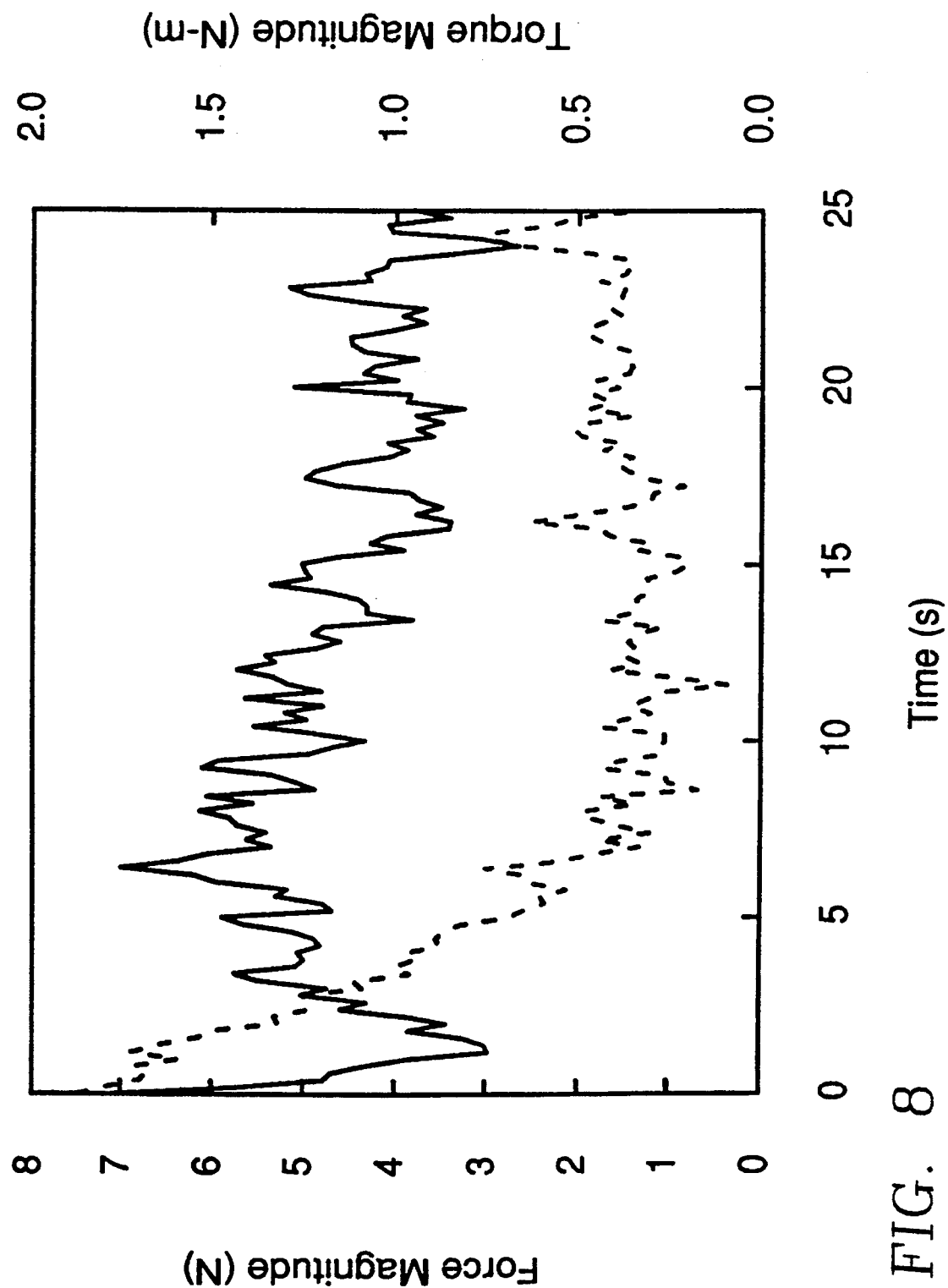
FIG. 8 is a graph of the door opening task using shared control, in which the solid line is the force vector magnitude in the MOTION frame and the dashed line is the torque vector magnitude in the MOTION frame.

For force control door opening, the M and B parameters of the impedance equation were specified and the K matrix was set to zero. The reference force setpoints were all set to zero except for the torque about the X axis which was set to 18 N-m. This torque setpoint caused the door to open. The results of the door opening task using force control are shown in FIGS. 7 and 8.

Figure 9:
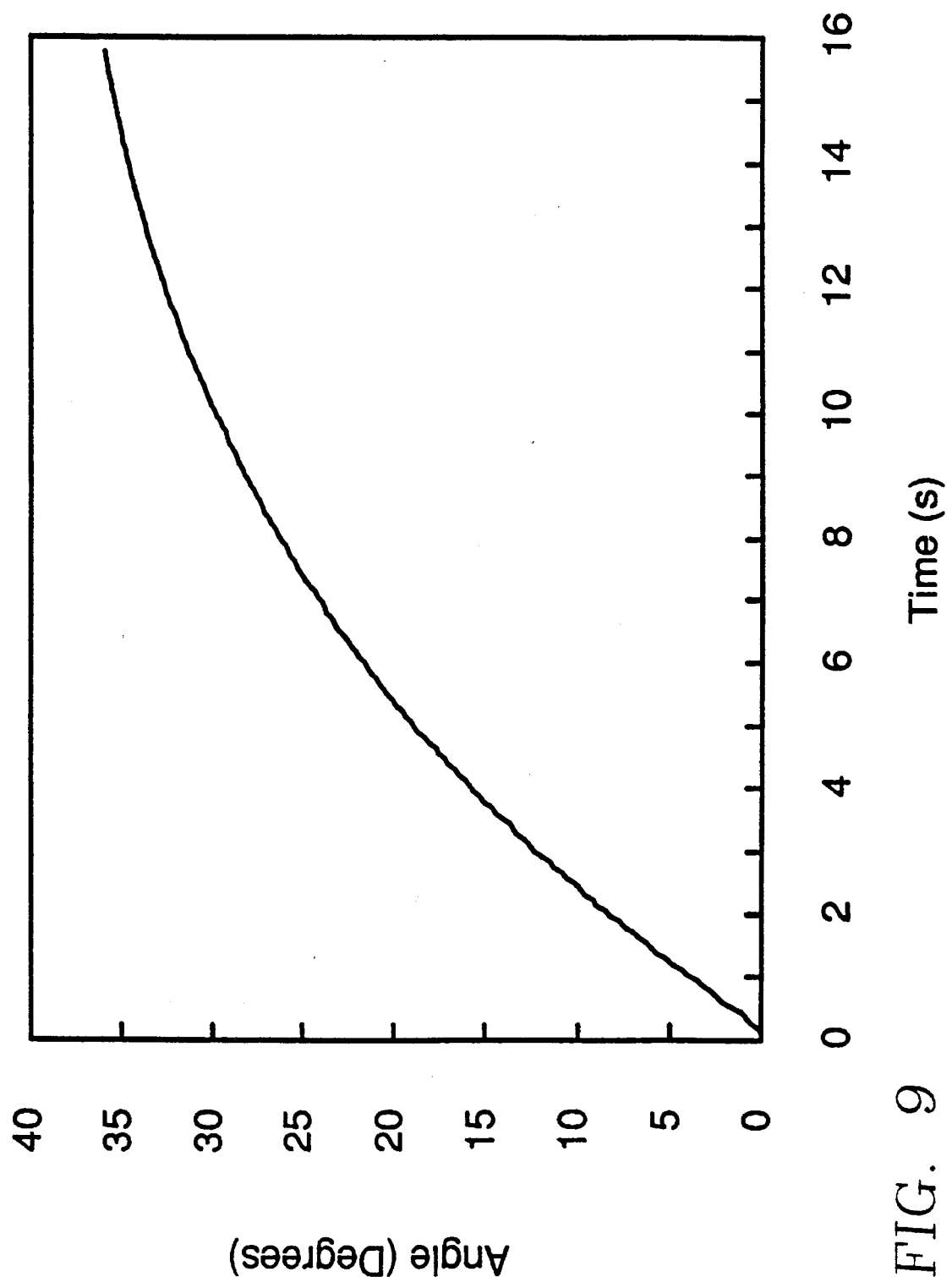
FIG. 9 is a graph of door rotation angle over time in the MOTION frame of a door opening task performed by the invention using spring control.
Figure 10:
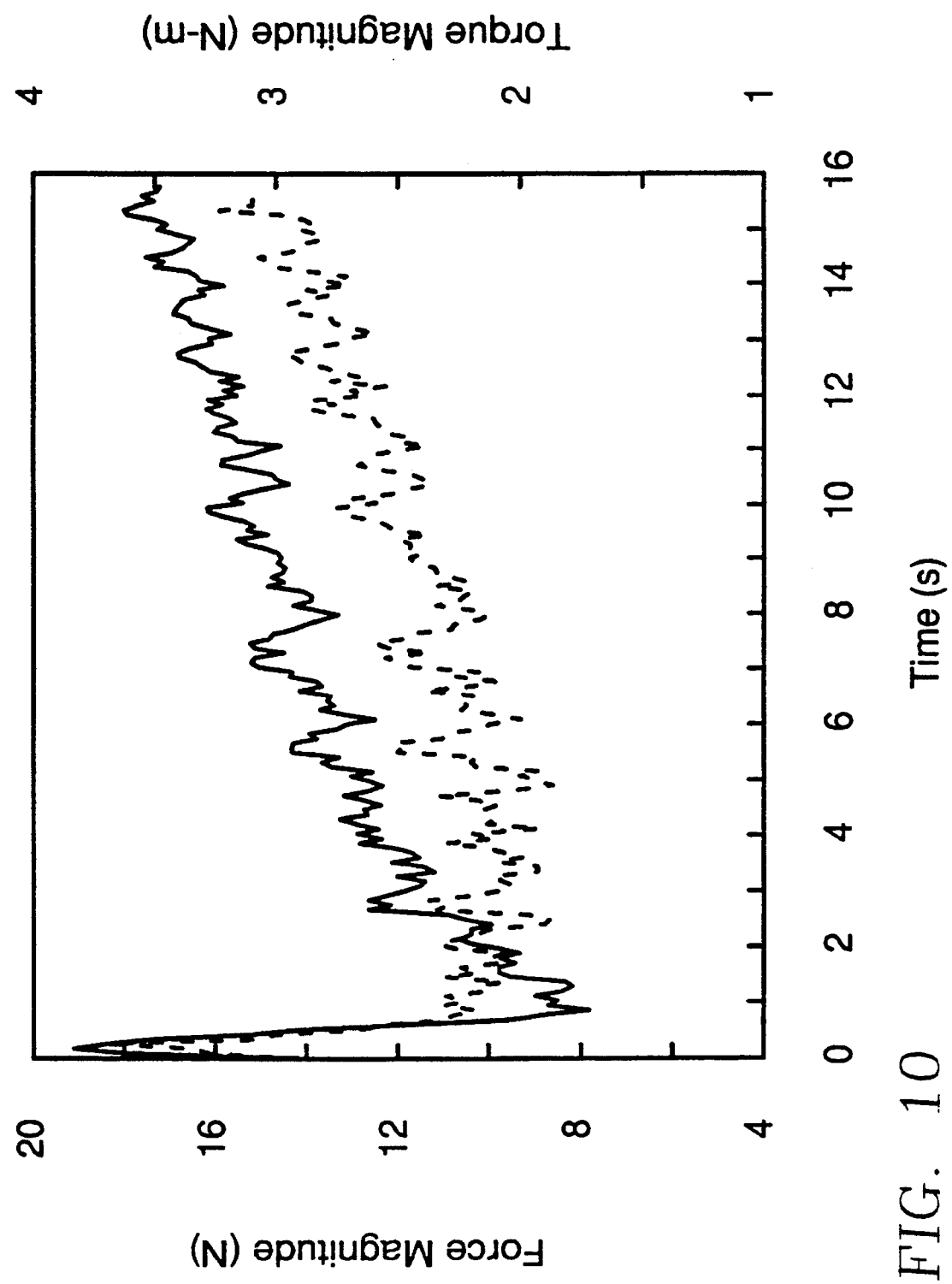
FIG. 10 is a graph of force and torque over time of the door opending task using spring control, in which the solid line is the force vector magnitude in the MOTION frame and the dashed line is the torque vector magnitude in the MOTION frame.

For spring trajectory door opening, the M, B, and K parameters of the impedance equation were specified. The reference force setpoints were all set to zero so that force control would provide compliance. The reference position setpoint $X_r$ was set to the destination position representing a rotation of 35 degrees. The reference velocity and acceleration were set to zero. The results of the door opening task using the spring trajectory are shown in FIGS. 9 and 10. The sensed force and torque magnitudes could probably have been reduced by setting the K matrix gains to zero except for about the X axis. Inaccuracy in the specified goal position versus the physical position after opening the door could have caused the sensed forces and torques to increase as the door opened. The rate of opening reduces as the door opens since the difference between the commanded and reference positions reduces.

Alternative Formulation

An alternative implementation approach for Equation 1 is $$\ddot{X}_p = B^{-1} \cdot [-M\ddot{X}_p - K X_p + F_a - F_r + F_t + F_d + F_f + F_s + F_d + F_l] = \ddot{X}_m + \ddot{X}_k + \ddot{X}_f + \ddot{X}_t + \ddot{X}_j + \ddot{X}_s + \ddot{X}_d + \ddot{X}_l$$

(27)

where $$X_p = X_c - X_r \quad (28)$$

The terms $\ddot{X}_m$, $\ddot{X}_k$, and $\ddot{X}_f$ are described below. The other terms, $\ddot{X}_t$, $\ddot{X}_j$, $\ddot{X}_s$, $\ddot{X}_d$, and $\ddot{X}_l$, are the same as the velocity inputs for the corresponding position based behaviors described above for teleoperation, joint limits, joint singularities, dither, and proximity. Since these terms are velocity inputs, the inputs can be computed in unique frames for each behavior before transforming the resulting velocities to the MERGE frame for summation. The summed velocity perturbation is integrated to produce the sensor based motion which is merged with the reference trajectory motion. A useful result of the approach is that the damping observed by the different sensors can be specified independently.

Inertia control is achieved by differentiating the computed perturbation velocity to provide the perturbation acceleration and then multiplying by the inertia and damping matrices, i.e., $$\dot{X}_m = -B^{-1} \cdot M \cdot \ddot{X}_p = -B^{-1} \cdot M \cdot \frac{(\dot{X}_p(n) - \dot{X}_p(n-1))}{\Delta t_{sample}} \quad (29)$$

where M is the reference inertia matrix, $\dot{X}_p(n)$ is the perturbation velocity at sample n, and $\Delta t_{sample}$ is the sample interval.

The resulting perturbation velocities due to position tracking error is, from Equation (27), $$\dot{X}_k = -B^{-1} . K . X_p \quad (30)$$

The perturbation velocities due to force tracking errors in the FORCE frame are given by $$\dot{X}_f = B^{-1} . (F_a - F_r) \quad (31)$$

Force tracking (force control) can be achieved by setting the stiffnesses, K, reference position trajectory velocity and virtual force inputs to zero in the desired force controlled degrees of freedom. The vector of actual forces $F_a$ then tracks the reference forces, $F_r$.

In conclusion, a control architecture for data driven merging of concurrent control behaviors has been developed and implemented on a redundant manipulator. The data driven fixed software approach provides a means for controlling remote space manipulators. The abstraction between task behaviors and manipulator specific mappings allows the approach to be applied to a wide variety of mechanisms. This would be most easily accomplished at the local site.

While the invention has been described in detail by specific reference to preferred embodiments, it is understood that variations and modifications thereof may be made without departing from the true spirit and scope of the invention.

APPENDIX: Teleoperation

Teleoperation inputs originate with an operator moving a 6 DOF hand controller. Two general cases are then possible: world mode teleoperation where the Cartesian velocity of the hand controller grip is computed relative to the fixed base of the hand controller, and tool mode teleoperation where the Cartesian velocity of the hand controller is computed relative to a frame fixed in the hand controller grip. Camera mode, where the manipulator moves relative to the viewing angle provided to the operator via cameras on a separate camera manipulator, is a special case of world mode. For systems with a local-remote architecture, computations for the teleoperation inputs may occur at both the local operator site and at the remote robot control site. In the implementation described in this specification, the local site computations are $$^{HH}\dot{X}_h = {^{HH}J_{HH}} . \dot{\theta}_h \quad (32)$$

for tool mode and $$^{HB}\dot{X}_h = {^{HB}J_{HH}} . \dot{\theta}_h \quad (33)$$

for world and camera modes. The joint velocities of the hand controller, $\dot{\theta}_h$, are measured in this implementation by differencing successive measured joint positions. The Jacobian $^{HH}J_{HH}$ transforms the hand controller joint velocities to equivalent Cartesian velocities of the hand controller handle with respect to a frame, HH, attached to the handle. The Jacobian $^{HB}J_{HH}$ transforms the hand controller joint velocities to equivalent Cartesian velocities of the hand controller handle with respect to a frame, HB, attached to the fixed based of the hand controller.

Computations at the remote site generate the velocities for the TELEOP (T) frame. For tool mode, the velocity of the TELEOP frame is given by $$^{T}\dot{X}_h = {^{T}_{HH}R} \cdot {^{HH}\dot{X}_h} \quad (34)$$

where $^{HH}\dot{X}_h$ is computed at the local site with Equation (32) and $$^{T}_{HH}R$$

rotates the translational and rotational velocity vectors of $^{HH}\dot{X}_h$ from a frame aligned with HH to a frame aligned with TELEOP. (The rotation matricies used here rotate both the translational and rotational components of a velocity vector from one frame, to another ignoring the dispacement between the frames.)

$$^{T}_{HH}R$$

is constant and is often an identity rotation. Therefore in tool mode, the velocities input along and about the axes of the TELEOP frame are the same as the velocities along and about axes of the hand controller handle frame, HH.

For world mode, the velocity of the TELEOP frame is given by $$^{T}\dot{X}_h = {^{T}_{WR}R} \cdot {^{WL}_{HH}R} \cdot {^{HB}\dot{X}_h} \quad (35)$$

where $^{HB}\dot{X}_h$ is computed at the local site with Equation (33), $$^{WL}_{HB}R$$

rotates the translational and rotational velocity vectors of $^{HB}\dot{X}_h$ from a frame aligned with HB to a fixed local WORLD frame, and $$^{T}_{WR}R$$

rotates the velocities from the remote WORLD frame to the TELEOP frame at the remote site.

$$^{T}_{WR}R$$

is dependent on both the position of the arm base relative to the WORLD frame and the current arm joint angles. Both the local and remote sites have a WORLD frame, WL, and WR, respectively. These are the same frames and are what link absolute motion at the local and remote sites.

For camera mode, the velocity of the TELEOP frame is given by $$^{T}\dot{X}_h = {^{T}_{WR}R} \cdot {^{WR}_{EYE}R} \cdot {^{ST}_{WL}R} \cdot {^{WL}_{HB}R} \cdot {^{HB}\dot{X}_h} \quad (36)$$

where $^{HB}\dot{X}_h$ is computed at the local site with Equation (33), $$^{WL}_{HB}R$$

rotates the velocities from HB to local WORLD and $$^{ST}_{WL}R$$

rotates the velocities from local WORLD to the ST frame which is fixed in the stereo display screen which the operator uses to view the remote site screen. The ST frame at the local site corresponds to the EYE frame at the remote site. The EYE frame is fixed between the stereo cameras at the remote site which are generating images for the stereo view at the local site.

$$^{WR}_{EYE}R$$

rotates the velocities from EYE to WORLD at the remote site. In the present implementation, the stereo cameras are mounred on a separate camera robot so $$^{WR}_{EYE}R$$

is dependent on the current joint angles of the camera arm.

$$^{T}_{WR}R$$

rotates the velocities from remote WORLD to TELEOP.

Force reflection back to the hand controller can be integrated with the control algorithm. Force reflection is independent of the remote site control, but is included here for completeness of the capability. Any force at the remote site could be reflected back to the local site, depending on the application. The classic single arm case is to reflect back the actual force measured with the wrist force-torque sensor, $F_a$. For the dual arm case, the move space forces are reflected back. Alternatively, the force tracking error, $F_r$–$F_a$, may be better to reflect to the operator. The forces selected to be reflected back to the local site will be called $^{TK}F_{fr}$ indicating the force reflection forces in the TASK (TK) frame. The TK frame will be different depending on the application or which forces are being reflected back to the local site. Computations for tool, world and camera modes are different, but the results for all cases are the forces to apply at the actuators of the hand controller. For tool mode the hand controller actuator forces are computed with $$\tau_h = J^T_{HH} \cdot {}^{HH}_{TL}R \cdot {}^{TL}_{TK}R \cdot {}^{TK}F_{fr} \quad (37)$$

For world mode the hand controller actuator forces are computed with $$\tau_h = J^T_{HH} \cdot {}^{HH}_{LW}R \cdot {}^{LW}_{RW}R \cdot {}^{RW}_{TK}R \cdot {}^{TK}F_{fr} \quad (38)$$

For camera mode the hand controller actuator forces are computed with $$\tau_h = J^T_{HH} \cdot {}^{HH}_{LW}R \cdot {}^{LW}_{ST}R \cdot {}^{EYE}_{RW}R \cdot {}^{RW}_{TK}R \cdot {}^{TK}F_{fr} \quad (39)$$

The computations for force reflection may be separated into local and remote computations. This may be required if the video representation of the scene is fed back with a different time delay than the force data. Then for camera mode force reflection it may be desirable to have the remote EYE frame time synchronized with the video images rather than with the reflected forces.

What is claimed is:

1. A method of operating a robot to perform a task in an environment of objects, said robot having joints and joint actuators, said method comprising the steps of:

decomposing said task into behavior kinematic quantities of plural behaviors to be exhibited simultaneously in respective behavior spaces by said robot, said plural behaviors including exerting force on at least one of said objects;

first transforming said behavior kinematic quantities from said respective behavior spaces to a common space;

computing, in said common space, from said behavior kinematic quantities command kinematic quantities including a force kinematic quantity corresponding to the force to be exerted on said one object and controlling said joint actuators in accordance with said command kinematic quantities;

wherein said computing comprises computing a first command kinematic quantity for a next sampling interval from;
(a) said behavior kinematic quantities, and
(b) other command kinematic quantities of a current sampling interval; and computing said other command kinematic quantities for said next sampling interval from said first command kinematic quantity of said next sampling interval and from said other command kinematic quantities of said current sampling interval.

2. The method of claim 1 wherein said computing a first command kinematic quantity comprises the computing of a commanded acceleration from a commanded velocity and a commanded position, and from behavior forces, behavior accelerations, behavior velocities and behavior positions.

3. The method of claim 1 wherein said computing a first command kinematic quantity comprises the computing of a commanded velocity from a commanded acceleration and a commanded position.

4. The method of claim 1 wherein:

said common space is a motion space common to which all of said behavior kinematic quantities are transformable; and said controlling said joint actuators is preceded by second transforming at least some of said command kinematic quantities from said motion space to an actuator space of said joint actuators.

5. The method of claim 4 wherein:

said robot further comprises joint position sensors for detecting positions of said joints; and said second transforming comprises computing a transform to said actuator space based upon current angles of said joints detected by said joint position sensors.

6. The method of claim 5 wherein:

said decomposing defines the behavior kinematic quantities of each of said behaviors in respective behavior spaces of each of said behaviors;

said first transforming comprises transforming the behavior kinematic quantities of each respective behavior from the corresponding behavior space to said motion space.

7. The method of claim 6 wherein said decomposing step defines the behavior kinematic quantities of each of said behaviors in respective behavior spaces each having a dimensionality corresponding to respective degrees of freedom of the robot.

8. The method of claim 7 wherein said decomposing step defines the behavior kinematic quantities of each of said behaviors in respective behavior spaces each having a dimensionality that does not exceed a maximum number of degrees of freedom of said robot.

9. The method of claim 1 wherein said decomposing step comprises the decomposing of said task into behavior kinematic quantities of said behaviors wherein each said behavior is governed in accordance with a corresponding input parameter of the type including force set points, joint singularity angle, joint limit angle, and obstacle location, said method further comprising reprogramming selected ones of said input parameters each sample interval, whereby to dynamically control said plural behaviors.

10. The method of claim 1 wherein said command kinematic quantities comprise acceleration, velocity and position, said behavior kinematic quantities comprise force, acceleration, velocity and position, and wherein the computing of said command kinematic quantity comprises equating a sum of proportionate differences between command and behavior accelerations, velocities and positions, respectively, with a sum of measured forces of said robot and of behavior forces.

11. The method of claim 10 wherein said computing of said command kinematic quantity further comprises making said proportionate differences proportionate in accordance with inertia damping and stiffness characteristics respectively, of said robot.

12. A method of operating a robot in successive sampling intervals to perform a task, said robot having joints and joint actuators with actuator control loops, said method comprising:

decomposing said task into behavior kinematic quantities comprising behavior forces, accelerations, velocities and positions of plural behaviors to be exhibited in respective plural behavior spaces by said robot simultaneously and first transforming said behavior forces, accelerations, velocities and positions to a common space;

computing in said common space command accelerations for a next sampling interval from:
(a) said behavior forces, accelerations, velocities and positions; and
(b) command velocities and positions of a current sampling interval;

computing command velocities and positions for said next sampling interval from said command accelerations of said next sampling interval and from said command velocities and positions of said current sampling interval; and controlling said joint actuators in accordance with at least one of said command accelerations, velocities and positions of said current sampling interval.

13. The method of claim 12 wherein:

said common space is a motion space common to which all of said behavior forces, accelerations, velocities and positions are transformable; and said controlling said joint actuators is preceded by second transforming said command accelerations, velocities and positions from said motion space to an actuator space of said joint actuators.

14. The method of claim 13 wherein:

said robot further comprises joint position sensors for detecting positions of said joints; and said second transforming comprises computing a transform to said actuator space based upon current angles of said joints detected by said joint position sensors.

15. The method of claim 14 wherein:

said decomposing defines the behavior forces, accelerations, velocities and positions of each of said behaviors in respective behavior spaces of each of said behaviors;

said first transforming comprises transforming the behavior forces, accelerations, velocities and positions of each respective behavior from a corresponding one of said respective behavior space to said motion space.

16. The method of claim 15 wherein the decomposing step defines the behavior forces, accelerations, velocities and positions of each of said behaviors in respective behavior spaces each having a dimensionality corresponding to respective degrees of freedom of the robot.

17. The method of claim 16 wherein the decomposing step defines the behavior forces, accelerations, velocities and positions of each of said behaviors in respective behavior spaces each having a dimensionality that does not exceed the maximum number of degrees of freedom of an arm.

18. The method of claim 17 wherein the decomposing step defines the behavior forces, accelerations, velocities and positions of an avoidance of one of a joint limit, joint singularity or obstacle, for which the corresponding behavior kinematic quantity is a function of the proximity of the joint limit, joint singularity or obstacle, respectively.

19. The method of claim 12 wherein the decomposing step defines the behavior forces, accelerations, velocities and positions of said behaviors wherein each said behavior is governed in accordance with a corresponding input parameter of the type including force set points, joint singularity angle, joint limit angle, obstacle location, and wherein any one and all said input parameters are reprogrammable at each sample interval, whereby to provide dynamic control of said plural behaviors.

20. The method of claim 12 wherein said computing said command accelerations comprises equating a sum of proportionate differences between command and behavior accelerations, velocities and positions, respectively, with a sum of measured forces of said robot and of said behavior forces.

21. The method of claim 20 wherein said computing said command accelerations further comprises making said proportionate differences proportionate in accordance with inertia, damping and stiffness characteristics, respectively, of said robot.

22. A robot control system for operating a robot in successive sampling intervals to perform a task in an environment of objects, said robot having plural joints and joint actuators, said system comprising:

means for decomposing said task into behavior kinematic quantities of plural behaviors to be exhibited simultaneously in respective behavior spaces by said robot, said plural behaviors including exerting force on at least one of said objects;

means for transforming said behavior kinematic quantities from said respective behavior spaces to a common space; and means for computing, in said common space, from said behavior kinematic quantities command kinematic quantities including a force kinematic quantity corresponding to the force to be exerted on said one object and controlling said joint actuators in accordance with said command kinematic quantities;

wherein said means for computing comprises a second means for computing a first command kinematic quantity for a next sampling interval from:
(a) behavior kinematic quantities, and
(b) other command kinematic quantities of a current sampling interval; and third means for computing said other command kinematic quantities for said next sampling interval from said first command kinematic quantity of said next sampling interval and from said other command kinematic quantities of said current sampling interval.

23. The system of claim 22 wherein said second means for computing comprises means for computing a commanded acceleration from commanded velocity and commanded position, and from behavior forces, behavior accelerations, behavior velocities and behavior positions.

24. The system of claim 22 wherein said second means for computing comprises means for computing a commanded velocity from commanded acceleration and commanded position.

25. The system of claim 22 wherein:
said common space is a motion space common to which all of said behavior kinematic quantities are transformable; and
said first means for computing and controlling said joint actuators comprises second means for transforming at least some of said command kinematic quantities from said motion space to an actuator space of said joint actuators.

26. The system of claim 25 wherein:
said robot further comprises joint position sensors for detecting positions of said joints; and
said second means for transforming comprises means for computing a transform to said actuator space based upon current angles of said joints detected by said joint position sensors.

27. The system of claim 26 wherein:
said means for decomposing defines the behavior kinematic quantities of each of said behaviors in respective behavior spaces of each of said behaviors;
said first means for transforming comprises means for transforming the behavior kinematic quantities of each respective behavior from the corresponding behavior space to said motion space.

28. The system of claim 27 wherein the means for decomposing defines the behavior kinematic quantities of each of said behaviors in respective behavior spaces each having a dimensionality corresponding to respective degrees of freedom of the robot.

29. The system of claim 28 wherein said means for decomposing defines the behavior kinematic quantities of each of said behaviors in respective behavior spaces each having a dimensionality that does not exceed the maximum number of degrees of freedom of said arm.

30. The system of claim 22 wherein said command kinematic quantities comprise acceleration, velocity and position, said behavior kinematic quantities comprise force, acceleration, velocity and position, and wherein said first means for computing comprises means for equating a sum of proportionate differences between command and behavior accelerations, velocities and positions, respectively, with a sum of measured forces of said robot and of behavior forces.

31. The system of claim 30 wherein the means for computing comprises means for equating the sum of said differences wherein said differences are proportionate in accordance with inertia, damping and stiffness characteristics, respectively, of said robot.

* * * * *